United States Patent [19]

Tokumitsu et al.

[11] 4,412,321
[45] Oct. 25, 1983

[54] RECORD CHANGER

[75] Inventors: Shunji Tokumitsu, Machida; Hiroyuki Urushibata, Yokohama; Masao Goto, Tokyo, all of Japan

[73] Assignee: Sony Corporation, Tokyo, Japan

[21] Appl. No.: 245,098

[22] Filed: Mar. 18, 1981

[30] Foreign Application Priority Data

Mar. 18, 1980 [JP] Japan ................................ 55-34611

[51] Int. Cl.³ ........................ G05B 19/28; G11B 3/06
[52] U.S. Cl. ...................................... 369/233; 369/41; 369/206; 369/226; 369/243
[58] Field of Search ............... 369/225, 226, 227, 228, 369/233, 243, 202, 206, 208, 41

[56] References Cited

U.S. PATENT DOCUMENTS

| | | | |
|---|---|---|---|
| 3,489,418 | 1/1970 | Fortune et al. | 369/211 |
| 4,085,940 | 4/1978 | Hashimi | 369/225 |
| 4,093,832 | 6/1978 | Isaacson et al. | 369/206 |
| 4,114,893 | 9/1978 | Leach et al. | 369/206 |
| 4,196,379 | 4/1980 | Iyeta et al. | 369/226 |

*Primary Examiner*—Steven L. Stephan
*Attorney, Agent, or Firm*—Lewis H. Eslinger; Alvin Sinderbrand

[57] ABSTRACT

A record changer for a record playing apparatus of the type including a center spindle on which records are adapted to be held and then dropped onto a turntable to be played, includes a tone arm for reproducing signals which are recorded on a record, dropped onto the turntable, a detecting device for detecting the position of the tone arm, an operating mechanism for controlling the operation of the record changer when the detecting device detects that the tone arm is in an inoperative position, and a device for stopping the operation of the record changer during operation of the operating means when the detecting device detects that the tone arm is in an operative position.

7 Claims, 14 Drawing Figures

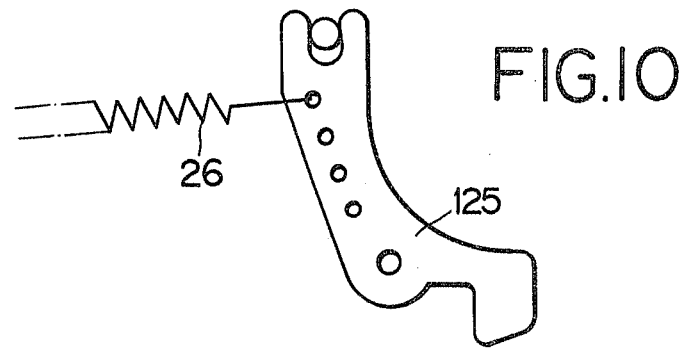
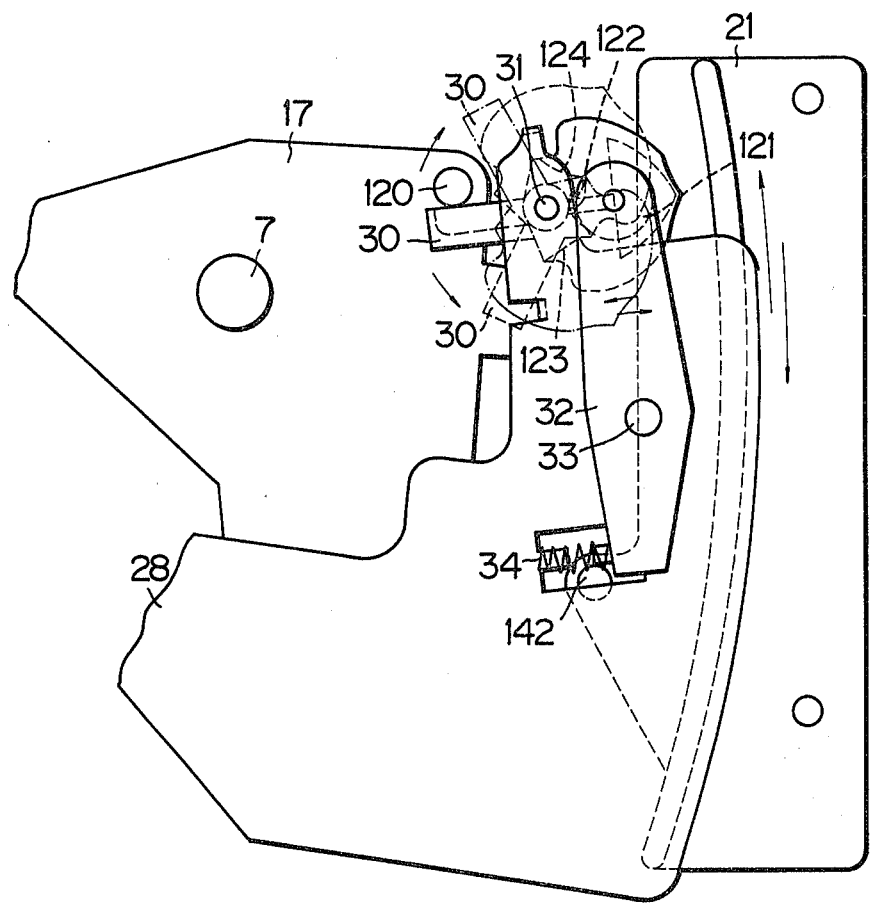
FIG.10

RECORD CHANGER

BACKGROUND OF THE INVENTION

1. Field of the Invention

The present invention relates to record playing apparatus, and more particularly to a record playing apparatus with an automatic record changer of the type in which a record is held on a center spindle and is made to drop onto a turntable to be played.

2. Description of the Prior Art

One type of conventional record changer with a center spindle is disclosed in U.S. Pat. No. 3,489,418 to H. J. Fortune et al. The center spindle of the changer functions to support and drop records in sequence by means of a mechanism within the center support which senses the presence or absence of a record for controlling an automatic shut-off mechanism. Along with aforementioned center support for dropping and sensing the records, there is also provided an edge support for the sole purpose of balancing the records. The tone arm is also balanced by a counterweight which is resiliently supported from the tone arm in all directions of relative movement between the tone arm and the counterweight.

However, the conventional record changer disclosed therein is purely mechanically arranged. With such mechanical arrangement, there are provided a start button and a stop button, the former of which is pushed when it is intended to play the record and the latter of which is pushed when it is intended to stop the record playing operation. With this construction, however, it is intended to keep the number of the operating buttons at a minimum and accordingly the operability of the apparatus is not at an optimum level.

Moreover, in this record changer, the returning mechanism of the tone arm and the dropping mechanism of the records are interlocked so that a record always drops when the tone arm is automatically returned. This results in the dropping of a record, even when the automatic-returning operation is performed in response to a stop command. In order to provide a safe operation, the lead-in operation is performed only upon a subsequent start initiation after at least the drive mechanism performs an automatic-returning operation. As a result, a problem occurs in that the record which has dropped in response to the drop command fails to be played. In order to solve this problem, it is conceivable to manually perform the return operation after the system has been set in a non-automatic or manual mode and after the power supply circuit has been broken. However, this method is not preferred because it is inferior in operability.

Furthermore, in order to perform a manual operation as well as an automatic changing operation in the record changer having a construction thus far described, there is provided an operating button for selecting the automatic and manual modes so that the automatic operation can be performed, when it is shifted to the automatic mode, whereas the manual operation can be performed when it is shifted to the manual mode. In other words, the automatic and manual operations operate absolutely independent of each other and cannot be interchanged. As a result, the operability of such record changer is inferior, and a large number of operating buttons must be used.

SUMMARY OF THE INVENTION

Accordingly, it is an object of this invention to provide an improved record changer that avoids the above-mentioned difficulties encountered with the prior art.

More particularly, it is an object of the present invention to provide an improved record changer which has excellent operating characteristics.

Another object of the present invention is to provide a record changer which has a reduced number of operating buttons but can perform a number of complicated operations.

A further object of the present invention is to provide a record changer with a single operating mechanism which can function as a drive mechanism and a stop mechanism.

A still further object of the present invention is to provide a record changer wherein records are prevented from dropping down from the center spindle when the tone arm is returned during the stopping operation.

A still further object of the present invention is to provide a record changer which can be manually operated, and in which the manual operation can be easily interchanged with the automatic operation.

In accordance with an aspect of the present invention, a record playing apparatus of the type including a center spindle on which records are adapted to be held and then dropped onto a turntable to be played, includes a tone arm for reproducing signals recorded on the records as they are dropped onto the turntable; detecting means for detecting the position of the tone arm; operating means for controlling the operation of the record playing apparatus when the detecting means detects that the tone arm is in an inoperative position; and means for stopping the operation of the record changer during operation of the operating means when said detecting means detects that the tone arm is in an operative position.

The above, and other objects, features and advantages of the invention will be apparent from the following detailed description of an illustrative embodiment which is to be read in connection with the accompanying drawings.

BRIEF DESCRIPTION OF THE DRAWINGS

FIG. 10 is a top plan view of an actuating lever assembly of the record player of FIG. 1 used for illustrating the toggle operation of the actuating lever for the lead-in and automatic returning operations;

DETAILED DESCRIPTION OF A PREFERRED EMBODIMENT

Figure 1:
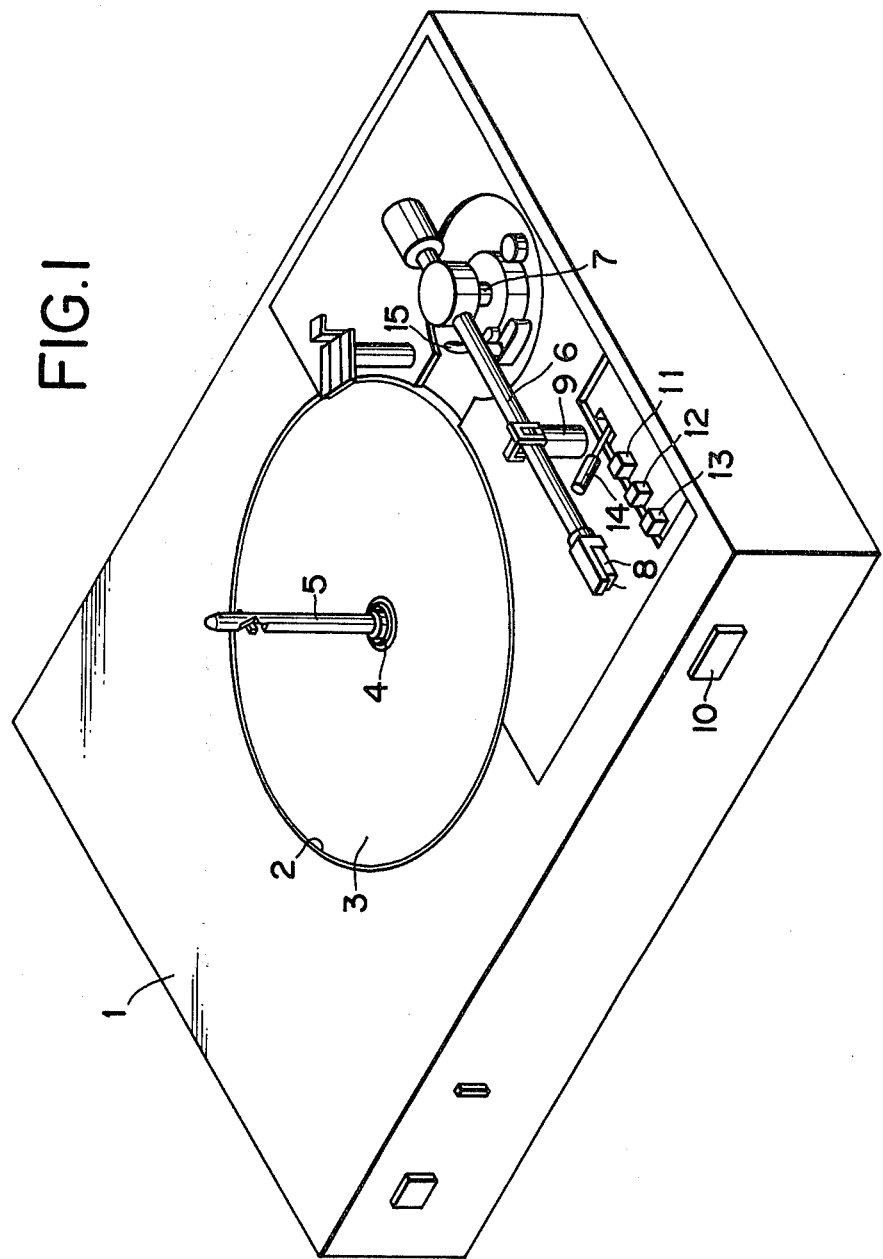
FIG. 1 is a perspective view of a record player with an automatic record changer according to one embodiment of the present invention.

Referring to the drawings, and initially to FIG. 1 thereof, a record player with an automatic record changer embodying the present invention has a top panel 1 which is formed with a large circular opening 2. In this opening 2, there is arranged a turntable 3 which is fit on a center shaft 4 such that the former frictionally engages with the latter. A center spindle 5 is detachably mounted in center shaft 4. At one side of turntable 3 and at a position above panel 1, there is arranged a tone arm 6 which is adapted to be rotated by a swing shaft 7, and a cartridge 8 is attached to the leading end of tone arm 6. Tone arm 6, in turn, is supported at an intermediate position thereon on an arm rest 9 when in its rest position.

A front panel of the record player is equipped with a start/stop switch 10, and arranged in a row adjacent tone arm 6 on the aforementioned panel 1, there are provided a record size selecting switch 11, a speed selecting switch 12 and a repeat switch 13. An operating lever 14 is further arranged on panel 1 so as to manually operate a tone arm lifter 15.

Figure 2:
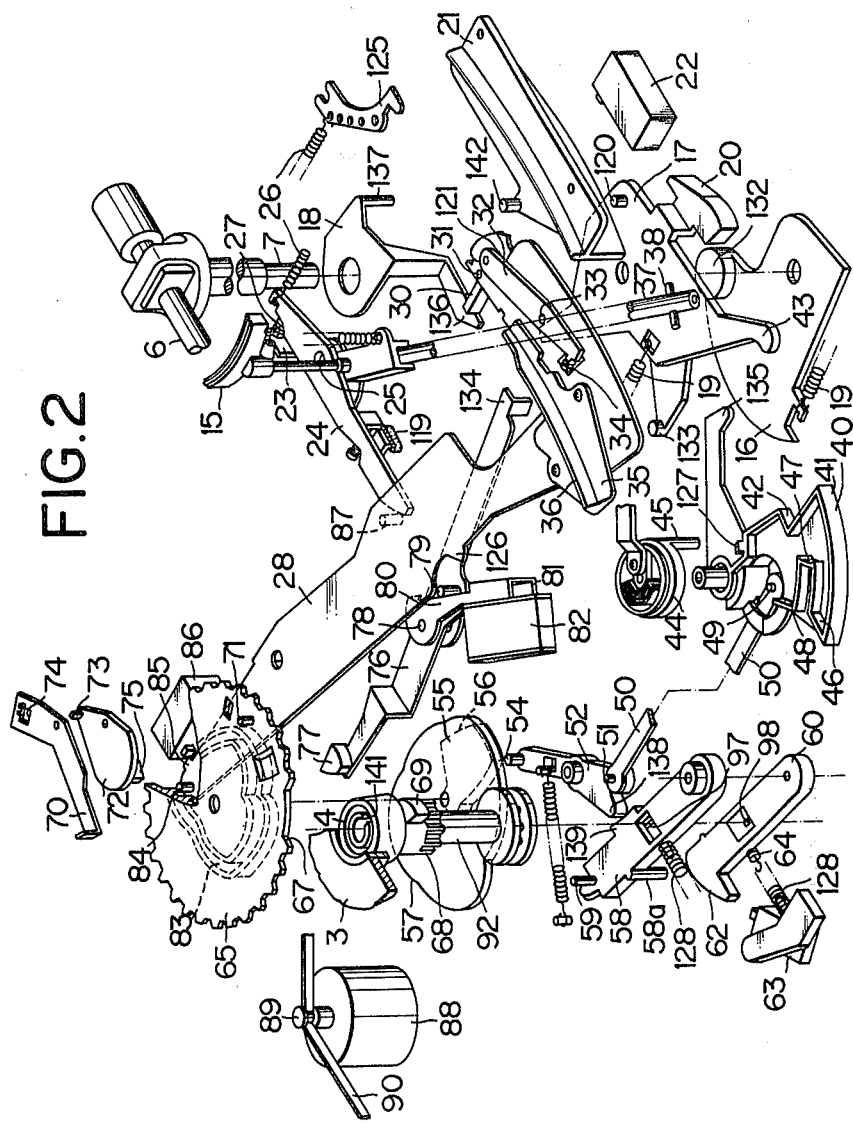
FIG. 2 is an exploded perspective view of the mechanism for the record changer of the record player of FIG. 1.
Figure 3:
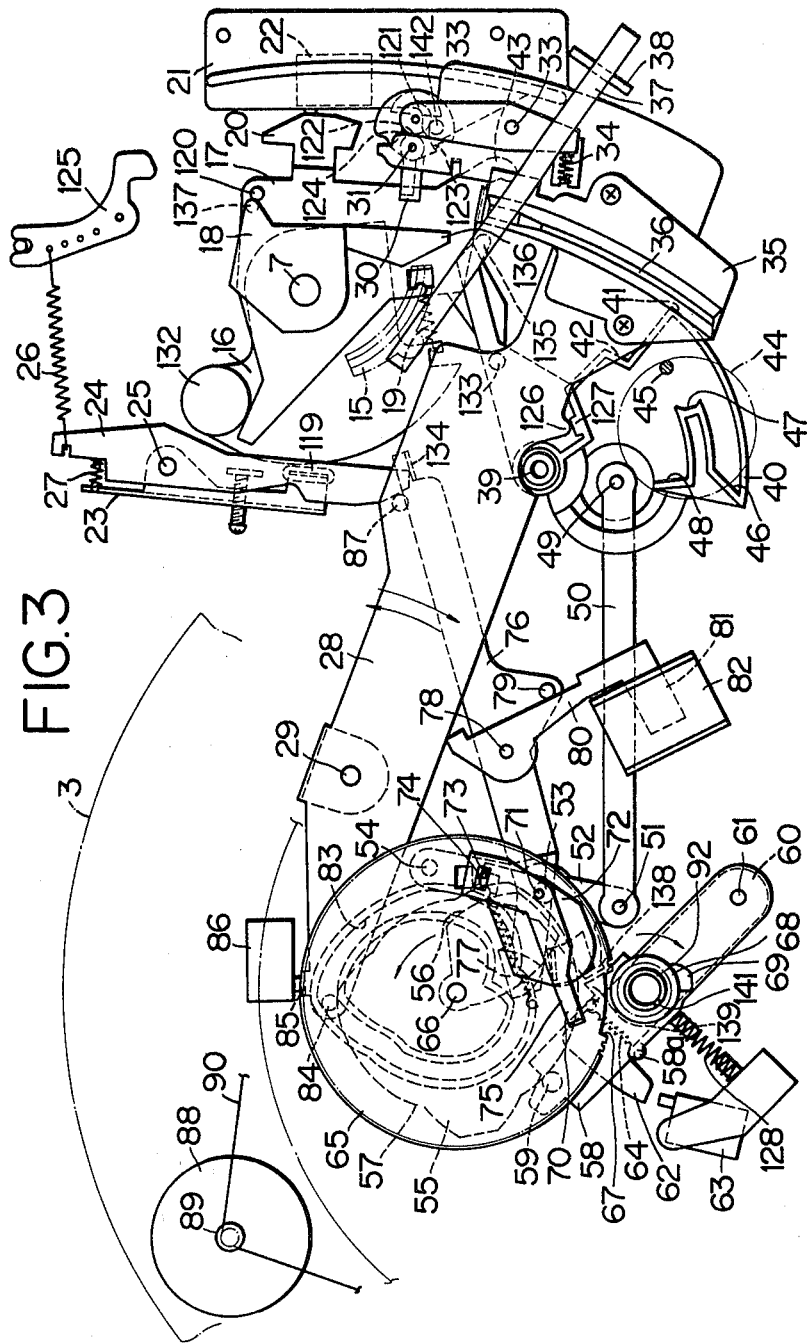
FIG. 3 is a top plan view of the mechanism for the record changer of the record player of FIG. 1.

The inner mechanism of the record player will now be described with reference to FIGS. 2 and 3. A brake plate 16 is fixed to swing shaft 7 of the aforementioned tone arm 6, and a lead-in lever 17 and a size reset lever 18 are rotatably mounted on swing shaft 7 so as to overlap brake plate 16. Lead-in lever 17 is connected to brake plate 16 by means of a coil spring 19. Lead-in lever 17 is also integrally provided with a projection 20, which is operative to push an arm switch 22 fixedly held on a supporting plate 21. At one side of the aforementioned brake plate 16, there are arranged a brake lever 23 and an actuating lever 24, both of which are rotatably supported by a common pivot pin 25. Moreover, a coil spring 26 is attached to one end of actuating lever 24, and a compression coil spring 27 is interposed between brake lever 23 and actuating lever 24.

Below turntable 3, there is arranged a main lever 28 which is rotatably supported by means of a pivot pin 29. An actuating lever 30 is held by means of a pin 31 on the leading end of lever 28 and is adapted to be reversed by means of a reverse lever 32 to thereby effect a toggle motion. The reverse lever 32 is supported on main lever 28 through a pin 33 and is biased in the counter-clockwise direction of FIG. 2 by a compression coil spring 34. On the upper side of main lever 28, is attached a cam plate 35 which is made of a synthetic resin material, and which has its cam portion 36 abutting against the side portion of a lifter lever 37. This lifter lever 37 has its leg portion rotatably supported (for vertical movement) by a pin 38 and its leading or free end portion abutting against the lower end of the support shaft for the aforementioned arm lifter 15.

At one side of main lever 28, there is arranged a size cam 40 which is rotatably supported by means of a pivot pin 39. Size cam 40 has one side thereof formed with two stepped portions 41 and 42, which are adapted to abut against an arm portion 43 of the aforementioned lead-in lever 17 to thereby effect a record size selection operation. Size cam 40 is further formed with three wall portions 46, 47 and 48 which are adapted to abut against the operating element 45 of a rotary plunger 44 which is adapted to move in three positions. The size cam 40 thus constructed is connected by means of a pin 49 to one end of a rod 50, the other end of which is connected by means of a pin 51 to a feedback lever 52. The feedback lever 52 is rotatably supported by means of a pin 53 and has secured to its leading or free end an upstanding pin 54 adapted to abut against a first small cam portion 56 which is formed on the underside of a cam plate 55. This cam plate 55 is formed on its outer peripheral portion with a second cam portion 57 which is adapted to abut against the leading end pin 59 of an actuating lever 58.

By means of a pin 61 supporting actuating lever 58, there is also rotatably supported a detecting lever 60, which has a projection 62 integrally formed thereon and which is adapted to push a switch 63 for detecting the presence or absence of a record. Detecting lever 60 and the aforementioned actuating lever 58 are connected together by means of a coil spring 64.

Above the aforementioned cam plate 55, there is arranged in an overlapping manner a drive gear 65, both of which are fixed to a common pivot pin 66. A portion of drive gear 65, is toothed on its outer circumference and, is further formed with a toothless or notched portion 67. The drive gear 65 thus formed is constructed so that it can engage with a pinion 68 which is fixed to the aforementioned center shaft 4. Further, center shaft 4 has integrally formed on its outer circumference a pawl 69, which is adapted to abut against the leading or free end of a start lever 70 which is supported by means of a pin 71 on the upper peripheral surface of drive gear 65. Below start lever 70, there is arranged an actuating lever 72 also supported on drive gear 65 by means of common pin 71. Actuating lever 72 has an upstanding pin 73 which is inserted into an opening 74 formed in start lever 70. Actuating lever 72 also integrally formed with a downward projection 75 which is positioned to face a land 77 formed at the leading or free end of a trigger lever 76. This trigger lever 76 is rotatably supported by a pin 78, and a pin 79 mounted on lever 76 is adapted to be pushed or biased by a plunger lever 80. Plunger lever 80 has its leading or free end formed with a projection 81 which coacts with the rod of a plunger 82.

The aforementioned drive gear 65 has its lower surface formed with a cam groove 83 which is adapted to engage with a pin 84 secured at the free end of the aforementioned main lever 28. Moreover, main lever 28 has its leading or free end formed with a tab 85 which is adapted to push a microswitch 86. A downwardly extending pin 87 is also secured to main lever 28 and is adapted to push or bias the free end portion of the aforementioned actuating lever 24. Adjacent one side of drive gear 65, there is arranged a motor 88, by which the aforementioned turntable 3 is rotationally driven by means of a belt 90 which runs on a pulley 89 of motor 88.

Figure 6:
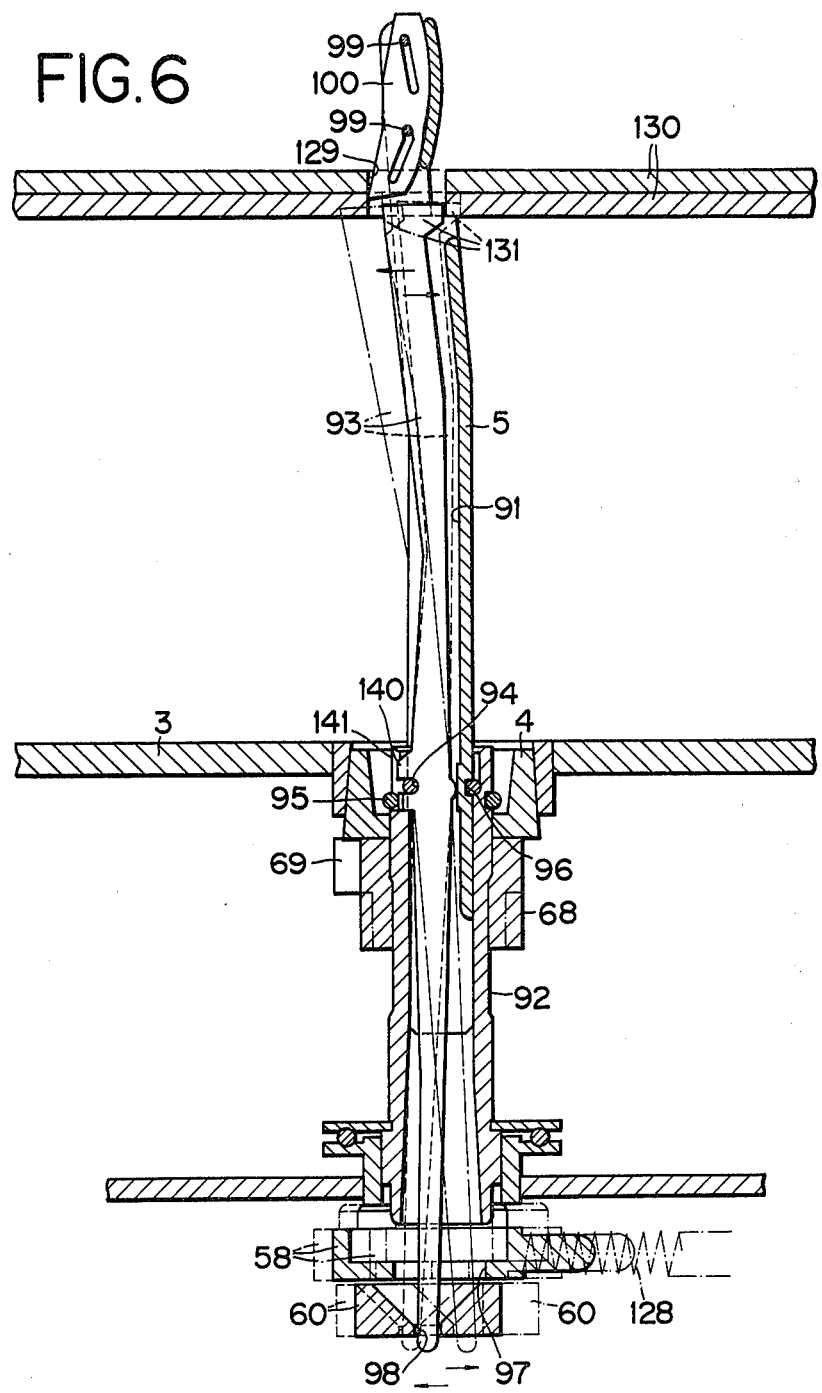
FIG. 6 is a cross sectional view of an essential portion of the center spindle of the record player of FIG. 1 and its arrangement with various other elements.

The center spindle 5 which is attached to the aforementioned center shaft 4 will now be described. The spindle 5 is molded of a synthetic resin such as a polyphenylene sulfide resin and is formed with a split slit 91 over its entire length, as shown in FIG. 6. Moreover, center spindle 5 is resiliently deformable in the radial direction by the action of slit 91 and is press-fit in a sleeve 92 which is fixed to the frame of the record player through the bore of center shaft 4. In slit 91, there is arranged a spindle lever 93, which is formed with a radial groove 94 adapted to receive a ring 95 whereby to rotatably support lever 93. Ring 95 is preferably an O-ring which is made of a synthetic resin or synthetic rubber and which is also fit in a groove 96 formed in the outer circumference of center spindle 5. Moreover, lever 93 has its lower portion extending through sleeve 92 and is loosely fit in a rectangular hole 97 of the aforementioned actuating lever 58 and is fit in small hole 98 of the detecting lever 60. At the upper portion of slit 91, on the other hand, there is slidably held by means of a pair of pins 99 a guide lever 100. Further, the aforementioned spindle lever 93 is formed above groove 94 with a projection 140 which is fit in a notch 141 of sleeve 92 to thereby regulate the rotational position of center spindle 5. The aforementioned O-ring 95 functions as a click or snap in mechanism for the press-fit of sleeve 92. In this manner, center spindle 5 is detachable so that the record player can be used as a conventional record player by removing center spindle 5 and replacing it with a conventional small spindle (not shown).

The control circuit of the record player for the construction thus far described now be described with reference to FIG. 4. The repeat switch 13, cam switch 86, record presence or absence detecting microswitch 63 and arm switch 22 thus far described are respectively connected with a main line 101. As a result, these electric parts are supplied with power at a constant voltage from input terminal 102 of main line 101. The start/stop switch 10 has its paired contacts connected with the common contact of speed selecting switch 12 and one contact of cam switch 86, respectively. Also, coil of the motor 88 has one terminal connected with main line 101 and its other terminal connected through the collector-emitter path of a transistor 103 to a ground line 104. The transistor 103 is connected so that it may be controlled by transistors 105 and 106. On the other hand, the aforementioned speed selecting switch 12 is connected so that it may control the short-circuiting of two lines of the coil of the aforementioned motor 88.

The aforementioned three-position plunger 44 is conrolled through size selecting switch 11 and a transistor 108, the latter, in turn being controlled by the output of a logic circuit 107. Logic circuit 107 is constructed of two NAND gates 109 and 110, four NOR gates 111, 112, 113 and 114, and a flip-flop 115, with the latter flip-flop 115 having its output terminal connected to the base of transistor 108. On the other hand, the aforementioned plunger 82 is connected to the collector of transistor 106.

Figure 5:
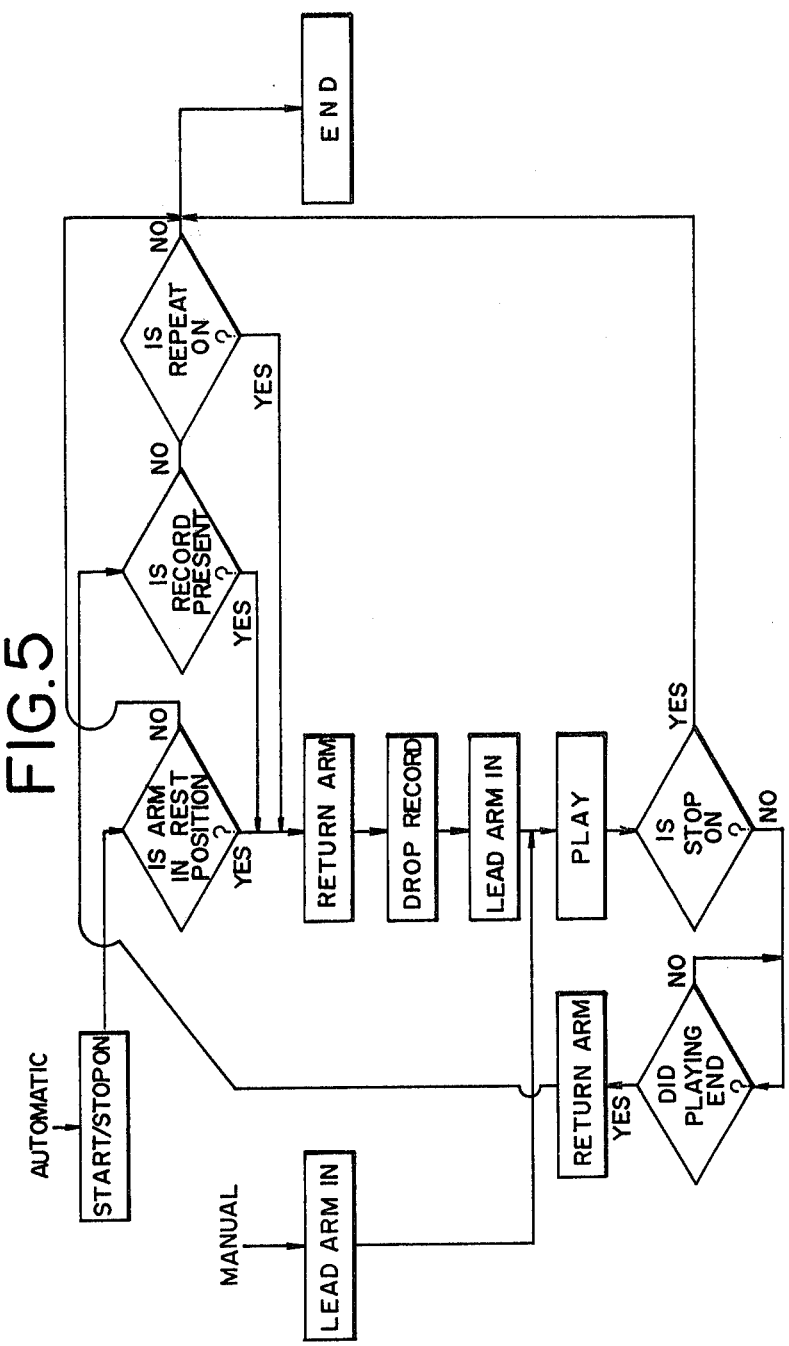
FIG. 5 is a flow chart showing the various operations of the record player of FIG. 1.

The operation of the record player having the construction thus far described will now be described in the order of operations shown in the flow chart of FIG. 5.

Figure 4:
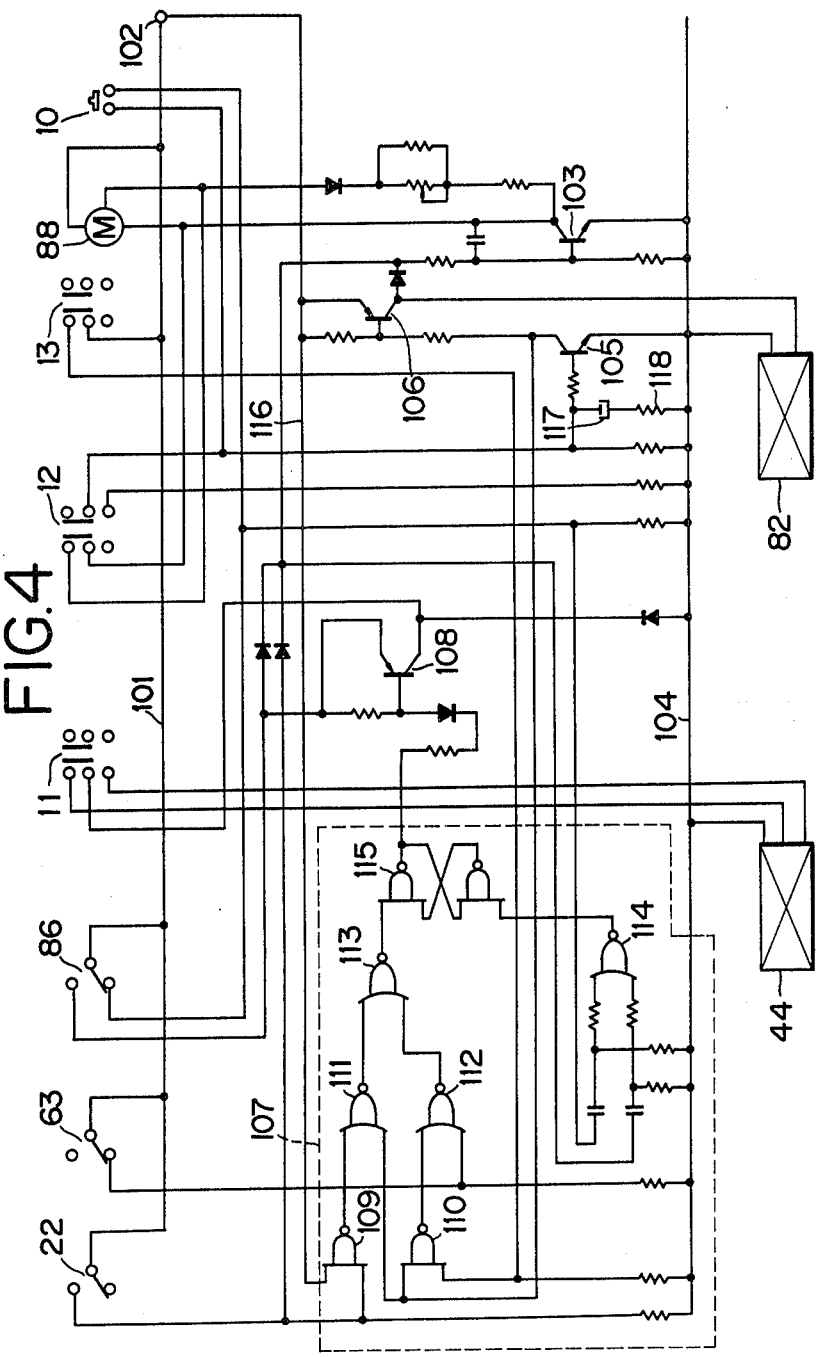
FIG. 4 is a circuit wiring diagram of the control circuit of the record player of FIG. 1.

First, if start/stop switch 10 on the front panel is pushed and operated during the rest condition of the record player, as shown in FIG. 1, the paired contacts of switch 10, as shown in FIG. 4, are rendered conductive so that power is fed from main line 101 through cam switch 86 and start/stop switch 10 to the base of transistor 105 to thereby render this transistor conductive. The transistors 106 and 103 are therefore also rendered conductive whereby the motor 88 starts to rotate by the switching operation of transistor 103. On the other hand, since transistor 106 is conductive, electric power is fed from a main line 116 to plunger 82 so that plunger 82 becomes energized. After this action, as will be described later, microswitch 86 is changed-over in accordance with the later-described rotation of drive gear 65 thereby to disconnect main line 101 from the base of transistor 105. However, before switch 86 is switched, a condenser 117 is charged so that plunger 82 is maintained in its energized condition for a time period corresponding to a time constant which is determined by a time constant circuit composed of condenser 117 and a resistor 118.

Figure 7:
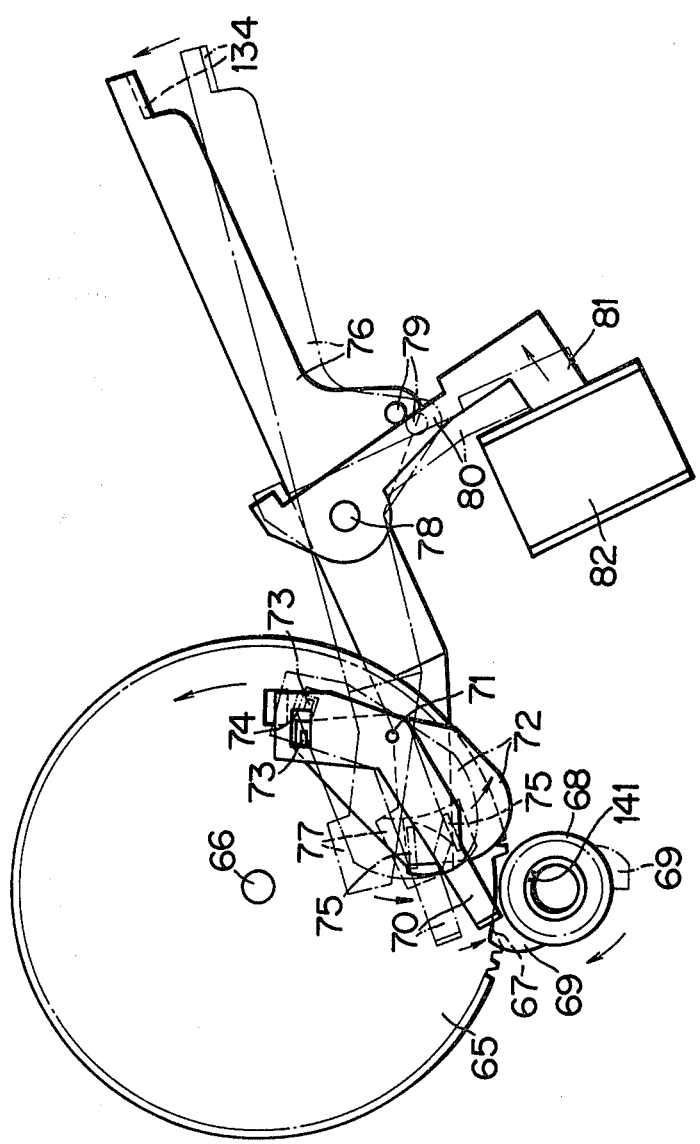
FIG. 7 is a top plan view of a portion of a trigger mechanism of the record player of FIG. 1, used in the starting operation.

When plunger 82 is energized, projection 81 is biased or pushed, as shown in FIG. 7, so that plunger 80 is swung counter-clockwise about pivot pin 78 to thereby push or bias pin 79. The trigger lever 76 is therefore swung counterclockwise about pin 78 so that its projection 77 pushes projection 75 of actuating lever 72. As a result, lever 72 is swung about pin 71 so that pin 73, in turn, swings start lever 70 counter-clockwise, as shown in FIG. 7, about pin 71 through opening 74. At this time, pinion 68 has already been rotationally driven throug belt 90 and turntable 3 by means of motor 88. As a result, pawl 69, which is formed on pinion 68, pushes the leading or free end of start lever 70. Since lever 70 is supported by drive gear 65, drive gear 65 starts to rotate. The notched portion 67 of gear 65 is then displaced from its initial position, so that gear 65 engages pinion 68 whereby the rotating force is transmitted from pinion 68 to drive gear 65.

Figure 8:
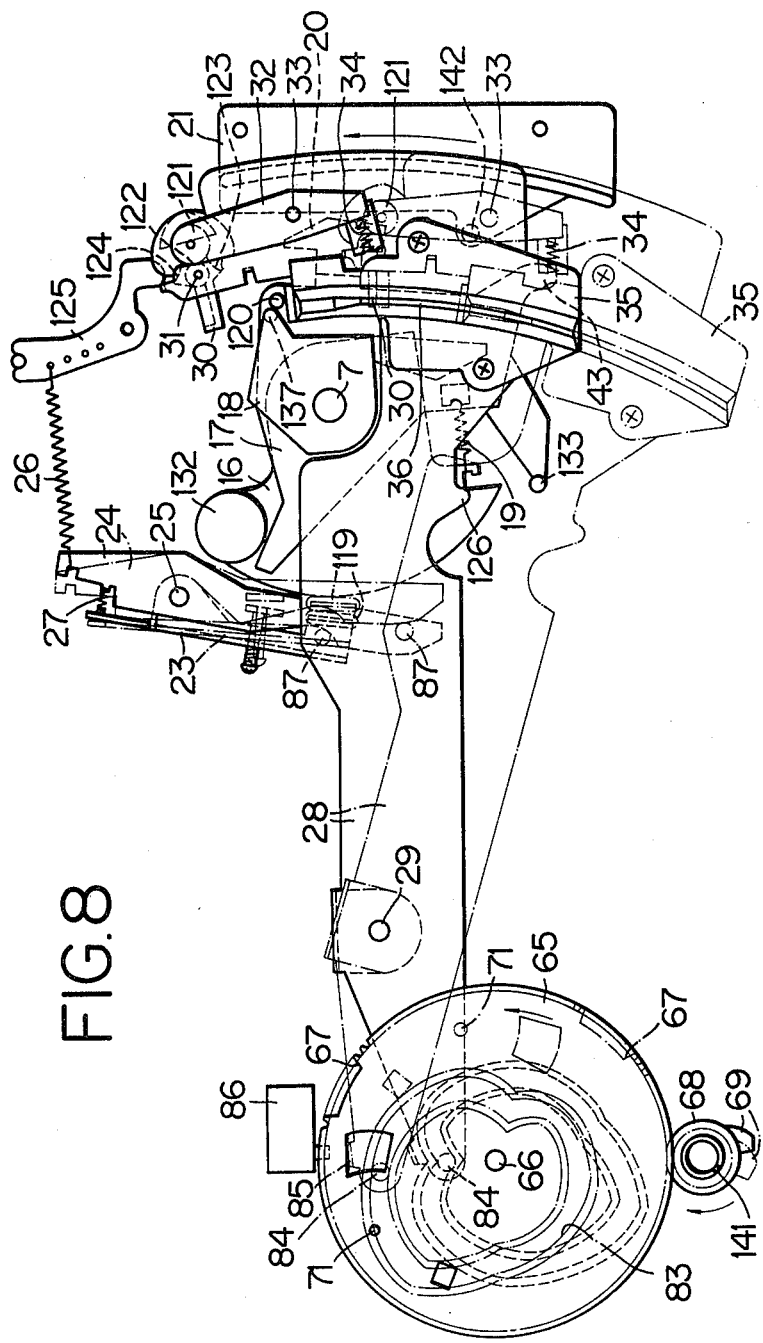
FIG. 8 is a top plan view of a main lever assembly of the record player of FIG. 1 used for illustrating the swinging operation of the main lever.

When drive gear 65 starts to rotate, main lever 28, which engages with cam groove 83 of gear 65 through pin 84, starts to swing counter-clockwise, as viewed in FIG. 8, about pivot pin 29. Tab 85 of lever 28 then disengages from microswitch 86 so as to change over this switch to the position opposite to that shown in FIG. 4. As a result, a control voltage is fed directly to base of transistor 103 from the main line 101 through switch 86 so that motor 88 continues its rotation (as shown in FIG. 4). Moreover, in accordance with the swinging motion of lever 28, pin 87 pushes or biases actuating lever 24, as shown in FIG. 8, so that brake lever 23 is swung counter-clockwise about pin 25 to thereby force a brake pad 119 into contact with brake lever 16. In this manner, swinging operation of the tone arm 6 is smoothly performed.

Figure 9:
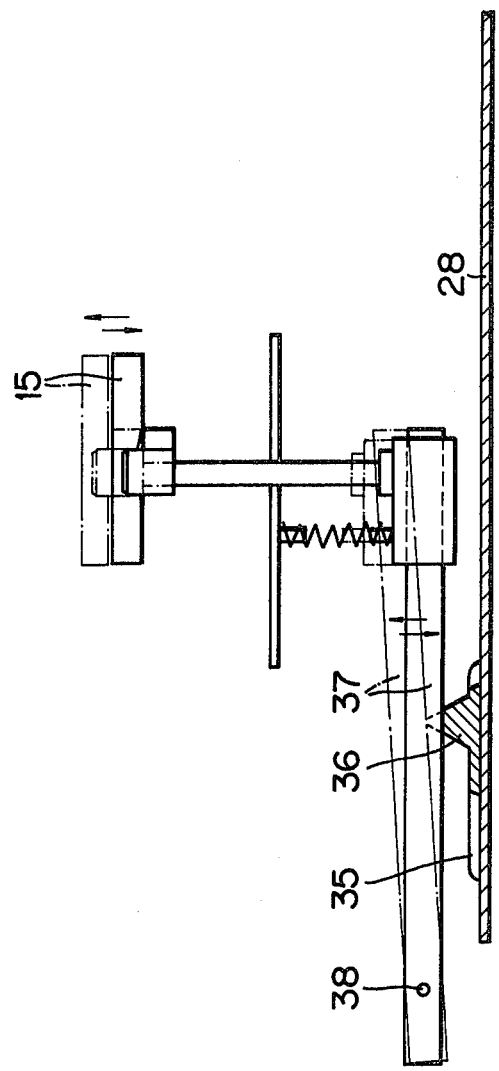
FIG. 9 is an elevational view of an arm lifter assembly of the record player of FIG. 1 showing the raising and lowering operations of the tone arm.

In accordance with the aforementioned swinging motion of main lever 28, moreover, cam portion 36 of cam plate 35 which is mounted on lever 28 pushes up and swings lifter lever 37 about pin 38 as shown in FIG. 9. As a result, arm lifter 15 pushes up tone arm 6 so that tone arm 6 performs its arm-up motion so as to leave arm rest 9.

While drive gear 65 rotates 180 degrees in the counter-clockwise direction from its start position, main lever 28 is swung counter-clockwise. This swinging direction is the same as that necessary to return tone arm 6. However, since at this time, tone arm 6 is already in its rest position, no motion thereof takes place to thereby effect an idle motion. In accordance with the swinging motion of main lever 28, actuating lever 30 is caused to push or bias pin 120 of lead-in lever 17. Since, however, tone arm 6 cannot be swung any more in the counter-clockwise direction as a result of a stopper mechanism (not shown), a large pressure is exerted upon actuating lever 30 so that this lever 30 is moved in the reverse or counter-clockwise direction, as shown in FIG. 10. Specifically, FIG. 10 shows the toggle mechanism for performing such reversing operation. When actuating lever 30 abuts against pin 120, it is swung, as indicated in broken lines in the same Figure, against the action of roller 121 of reverse lever 32 so that roller 121 is relatively moved from a center recess 122 to a recess 123 at one side by the pushing or biasing force of compression coil spring 34. Incidentally, lever 30 is formed with another recess 124 at the other side. When main lever 28 is further swung, actuating lever 30 on main lever 28 abuts against a reset plate 125 whereby actuating lever 30 is reset to its original position, as indicated by the solid lines in FIG. 10. Thus, preparation is made for the subsequent lead-in operation. Incidentally, reset of the lever 30, which has been reversed to a position indicated by dotted lines, is performed by a pin 142 which is anchored on supporting plate 21.

In accordance with the aforementioned forward swinging motion of main lever 28, projection 126 thereof disengages from projection 127 of size cam 40 whereby to free cam 40 for its swinging motion. In accordance with the aforementioned rotation of drive gear 65, small cam 56 of cam plate 55 is rotated together therewith to push or bias pin 54 of feedback lever 52. As a result, size cam 40 rotates once by means of rod 50 in a clockwise direction, as viewed in FIG. 11, about pivot pin 39. When pin 54 slides over plateau of the cam 56, feedback lever 52 is swung counter-clockwise about pin 53 whereby to free size cam 40 is swung by means of link 50 counter-clockwise about pivot pin 39. As a result, size cam 40 is set so that its wall portion 46 or 48 is in abutting engagement with operating element 45 of three-position plunger 44.

The operation of three-position plunger 44 as controlled by the circuit shown in FIG. 4 will now be discussed. In particular, when main lever 28 is rotated switch 86 is turned on. When switch 86 is turned ON, electric power is fed from main line 101 through switch 86 to the base of transistor 108 to rendered transistor 108 conductive. Then, electric power is fed through transistor 108 and switch 11 to three-position plunger 44 whereby plunger 44 is rotated clockwise or counter-clockwise in accordance with the operated position of switch 11.

Figure 12:
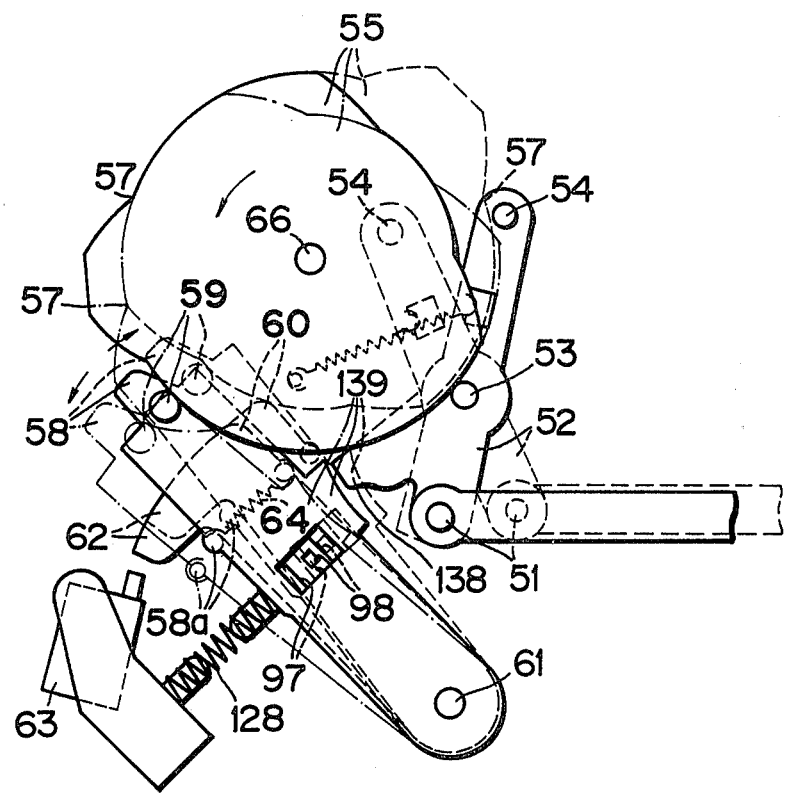
FIG. 12 is a top plan view of a record detecting assembly of the record player of FIG. 1 used for illustrating the operation for detecting the presence or absence of a record.

In accordance with the aforementioned rotation of drive gear 65, the second larger cam portion 57 of cam plate 55 is rotated. Cam portion 57, in turn pushes pin 59 to swing actuating lever 58 counter-clockwise, as viewed in FIG. 12. At this time, however, detecting lever 60, which is connected to actuating lever 58 through spring 64 and which has its small hole 98 arranged in engaging relation with the lower end of spindle lever 93, is restricted in movement by spindle lever 93, the latter having its upper end abutting against the wall of center hole 129 of the lowermost record 130 placed on center spindle 5. This means that lever 60 is not rotated in the direction indicated by dot-dash lines in FIG. 6. As a result, detecting lever 60 does not swing counter-clockwise about pin 61, as indicated by dot-dash lins in FIG. 12, and its projection 62 does not push or bias microswitch 63. Accordingly, the presence of a record 130 is detected. At this time, since detecting lever 60 is not swung, spring 64 is extended so that only actuating lever 58 is swung.

When pin 59 of the actuating lever 58 slides over the plateau of cam portion 57, lever 58 is then swung clockwise about pin 61 by the action of a compression coil spring 128. Then, pin 58a of lever 58 pushes on the side of detecting lever 60 to thereby swing the same clockwise. Accordingly, at this time, the two levers 58 and 60 are swung together clockwise, as indicated by the broken lines in FIG. 12. Spindle lever 93, which has its lower end in engaging relation with the small hole 98 of detecting lever 60, is thus swung clockwise, as indicated by the broken lines in FIG. 6, about ring 95. As a result, the upper end of lever 93 pushes or biases the inner circumference of center hole 129 of the lower most record 130 to thereby to to move this record 130 rightwardly, as viewed in FIG. 6. As a result, the lowermost record 130 is released from its engagement with the edge 131 of center spindle 5 to cause it to drop along center spindle 5 until it is placed upon turntable 3.

The operations thus far described are performed during the front or first half rotation of drive gear 65. Since, however, gear 65 is formed with only one toothless or notched portion 67, it continues its rotation. During this time, the lead-in operation of tone arm 6 is accomplished. By means of the rear or second half rotation of drive gear 65, main lever 28, which engages with cam groove 83 of gear 65 through pin 84, is swung clockwise about pivot pin 29 from the position indicated at solid lines in FIG. 8, to the position as indicated by dot-dash lines. Actuating lever 30, which is supported on lever 28, pushes pin 120 to thereby swing lead-in lever 17 clockwise, as viewed in FIG. 8, about swing shaft 7. Since this swinging motion of lever 17 is transmitted to brake plate 16 by means of a projection 132 formed on brake plate 16 and since brake plate 16 itself is fixed to swing shaft 7 of tone arm 6, tone arm 6 is swung clockwise about swing shaft 7, thus effecting the lead-in operation.

Figure 11:
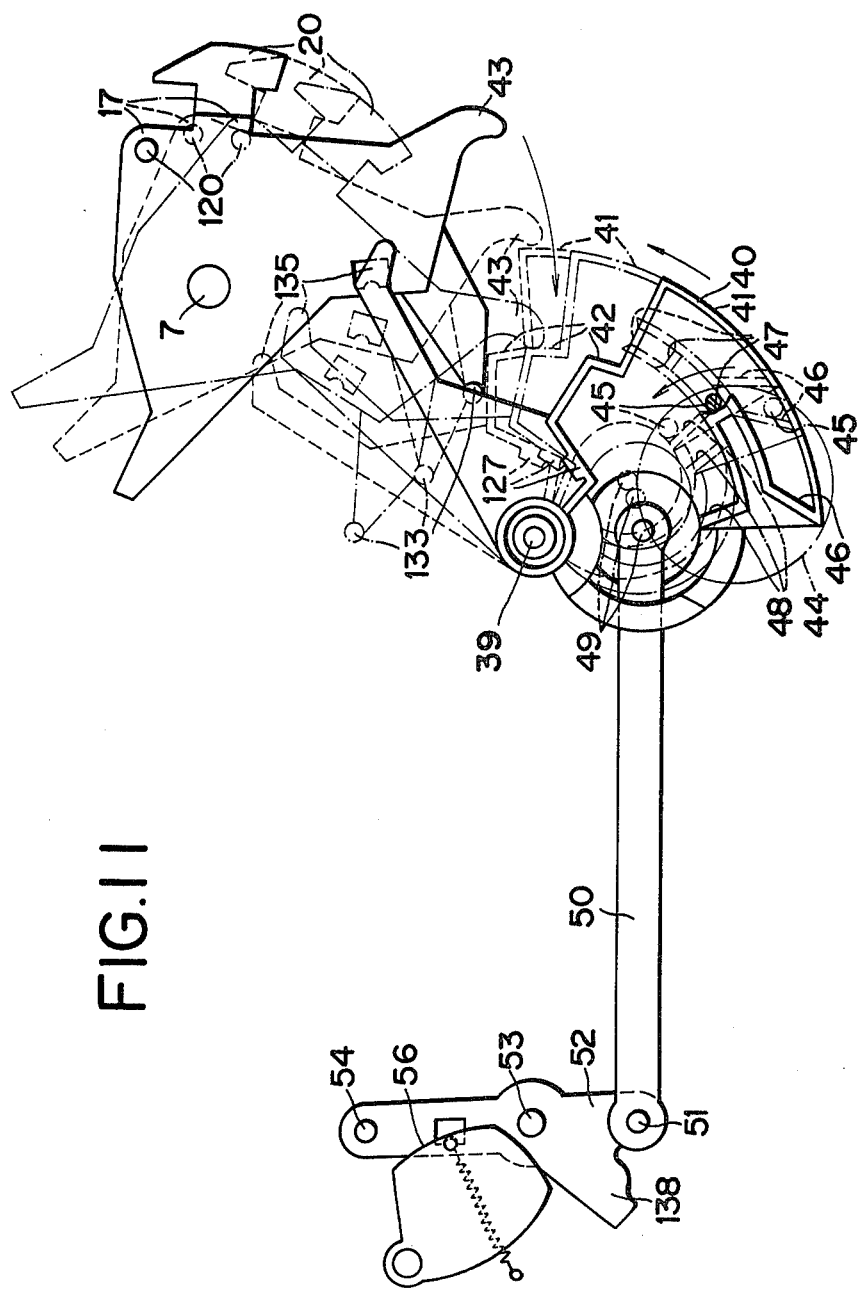
FIG. 11 is a top plan view of a record size selecting mechanism of the record player of FIG. 1 used for illustrating the setting operation of a size cam.

When stylus carried on the cartridge 8 at the leading end of tone arm 6 is brought to the position corresponding to the groove at the circumferentially outermost position of record 130 by the swinging motion of tone arm 6, arm 43 of lead-in lever 17 abuts against the stepped portion 41 or 42 of size cam 40, which has been swung to a predetermined position by rotary plunger 44, as shown in FIG. 11. Lead-in lever 17 therefore is stopped from rotating. Accordingly, tone arm 6 is also stopped from its swinging motion. It should be appreciated that the stepped portion 41 or 42 of size cam 40 with which arm 43 is brought into abutting engagement is determined in accordance with the direction that rotary plunger 44 is rotated in accordance with the selecting operation of size selected switch 11.

When tone arm 6 has its lead-in position regulated by size cam 40 such that it is stopped from its swinging motion, actuating lever 30 has a large biasing force applied so that it is reversed, as indicated by dot-dash lines in FIG. 10. As a result, only main lever 28 continues in its swinging motion. By this swinging motion of main lever 28, the position of cam portion 36 of cam plate 35 on lever 28 is changed from that indicated by dot-dash lines in FIG. 9 to that indicated at solid lines so as to lower tone arm 6. As a result, the stylus carried on cartridge 8 at the leading end of tone arm 6 is brought into contact with the record 130 placed upon turntable 3. The record playing operation is thereby started. When drive gear 65 is rotated one revolution so that main lever 28 is returned to its initial position shown in FIG. 3, tab 85 thereof pushes or actuates switch 86. In this condition, drive gear 65 is stopped from rotating by the action of its notched portion 67. As a result, switch 86 is pushed or actuated, and the output of switch 86 resets flip-flop 115 through NOR gate 114 to thereby render transistor 108 inoperative. As a result, rotary plunger 44 is returned to its neutral position. Hence, main lever 28 is returned to the position shown in FIG. 3, and moreover, projection 126 of lever 28 pushes projection 127 to return size cam 40 to its original position. As a result, tone arm 6 is not prevented from being swung by size cam 40 while the record is being played.

Figure 13:
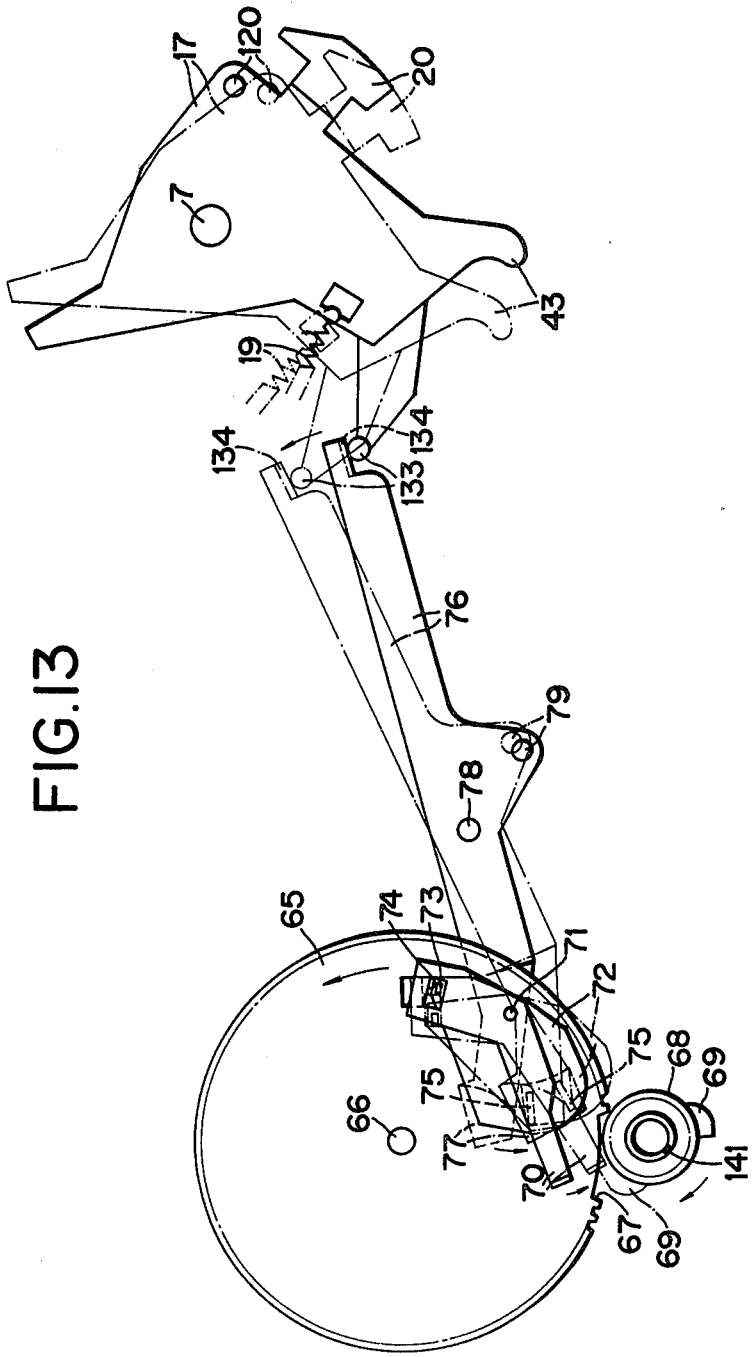
FIG. 13 is a top plan view of a record end detecting mechanism of the record player of FIG. 1 used for illustrating the record end detecting operation and the returning operation.

Thus, record 130 dropped onto turntable 3 is reproduced. During this reproduction operation, tone arm 6 is gradually guided to the center of record 130 by the spiral groove thereon while it is being swung. When the stylus of cartridge 8 comes to the groove closest to the center of record 130, projection 133 of lead-in lever 17 pushes tab 134 of trigger lever 76, as shown in FIG. 13, in accordance with the swinging motion of tone arm 6. Then, similar to the case in which the aforementioned plunger 82 is energized, pinion 68 and drive gear 65 are brought into engagement with each other by actuating lever 72 and start lever 70 so that drive gear 65 starts to rotate again. During the front or first half rotation of drive gear 65, main lever 28 is swung counter-clockwise, as shown in FIG. 8, about pin 29 to perform the arm-up operation by means of cam portion 36 of lever 28. At this time, moreover, since tone arm 6 is in its forward swung position, actuating lever 30 on lever 28 pushes pin 120 to thereby return tone arm 6 to its original radial position through lead-in lever 17.

Moreover, the presence or absence of record 130 on center spindle 5 is detected at the same time when tone arm 6 begins its returns operation. This detection is the same as the aforementioned first detecting operation and is performed by actuating lever 58 and detecting lever 60 through cam portion 57 of cam plate 55 which is made rotatable with the drive gear 65. Unless microswitch 63 is pushed by projection 62 of detecting lever 60, record 130 is still detected as being present. After tone arm 6 has been completely returned by actuating lever 30, detecting lever 60 is swung backwardly, as shown in FIG. 6, to cause another record 130 drop from spindle 5 onto turntable 3.

When tone arm 6 is completely returned, actuating lever 30 on the aforementioned main lever 28 is subjected to a large force so that it is reversed, as shown in FIG. 10. Moreover, when main lever 28 is swung, it abuts against reset plate 125 so as to reset the same. On the other hand, if main lever 28 is swung backward during the subsequent rear or second half rotation of drive gear 65, then actuating lever 30 pushes lead-in lever 17 through the pin 120 to lead in tone arm 6. Tone arm 6 is then lowered by cam portion 36 on main lever 28 so that the record 130 which has newly dropped onto turntable 3 is played. So long as a record 130 is present on center spindle 5, it is caused to be dropped and played.

Figure 14:
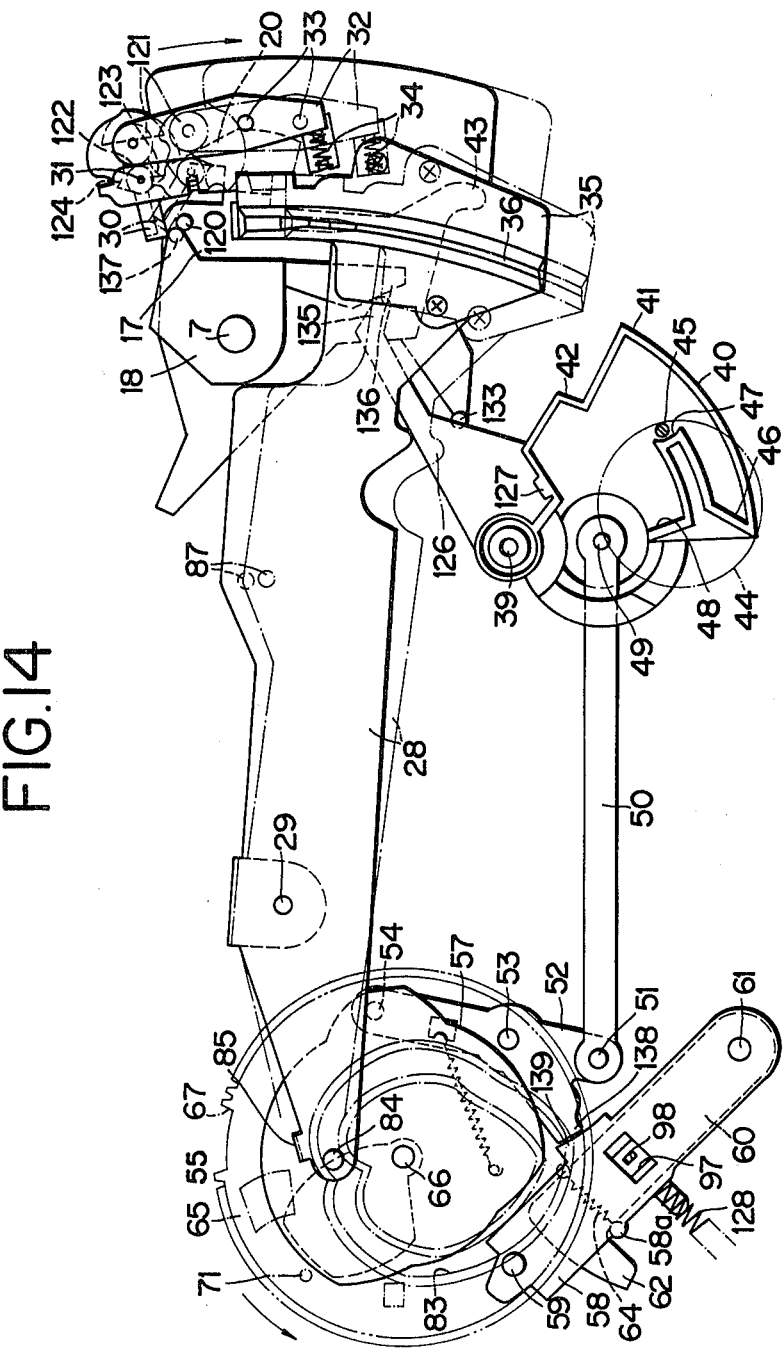
FIG. 14 is a top plan view of the main lever assembly of the record player of FIG. 1 used for illustrating the holding operation of a size select lever by the size cam.

After the playing operation of the aforementioned first record 130 has been finished, it is detected whether or not any record 130 remains on center spindle 5. If it is detected that there is no record 130 remaining, the aforementioned detecting lever 60 is swung together with actuating lever 58 counter-clockwise, as viewed in FIG. 12, so that its projection 62 pushes switch 63. Accordingly, it is detected that there is no record 130 remaining on center spindle 5. Then, switch 63 is turned OFF, as shown in FIG. 4, and the input to NOR gate 112 is changed from a logic level "1" state to a logic level "0" state so that the output of flip-flop 115 is inverted and transistor is rendered inoperative. The power supply to the three-position plunger 44 is therefore interrupted so that its operating element 45 is returned to its neutral position. Accordingly, size cam 40 is set at the position shown by solid lines in FIG. 11, so that the leading end of an arm 135, which is formed on size cam 40, as shown in FIG. 14, is shifted to position where it abuts against protrusion 136 of size reset lever 18. Even if main lever 28 is swung backward in this condition, actuating lever 30 first buts against a pin 136 of size reset lever 18 so that it is subjected to a large force until it is reversed. More specifically, main lever 28 does not lead in tone arm 6 through lead-in lever 17, but rather, tone arm 6 resides in its arm rest position. Moreover, since tone arm 6 is held on arm rest 9, microswitch 22 is turned OFF. When drive gear 65 is rotated one revolution, cam switch 86 is turned OFF so that transistor 103 is rendered inoperative. As a result, motor 88 stops its rotation so that the record player as a whole is brought into its rest condition.

On the other hand, if repeat switch 13 is pushed, even if it is detected that there is no record 130 present on center spindle 5, one input terminal of NAND gate 110 shown in FIG. 4 is at level "0". As a result, even if switch 63 is turned ON, the output of 115 is not inverted so that transistor 18 remains in its conductive condition. As a result, three-position plunger 44 is continuously fed electric power from the power source so that size cam 40 is held in the position indicated either by dot-dash lines or by solid lines in FIG. 11. Consequently, the tone arm 6 is led in so that the record 130 on the turntable is played again. In other words, a repeat operation is performed. This operation is continued as many times as desired as long as start/stop switch 10 is not actuated. It should be noted here that the repeat operation is to be performed only when there is no record 130 remaining on center spindle 5.

In the record player thus far described, the record playing operation is not performed if the tone arm is not at its rest or inoperative position when start/stop switch 10 is pushed to effect the automatic playing operation. More specifically, since arm switch 22 is not turned OFF when start/stop switch 10 is turned ON the output of switch 22 is fed to NAND gate 109 so that the output of flip-flop 115 is inverted. As a result, transistor 108 is rendered inoperative so that no electric power is fed to three-position plunger 44. As a result, similar to the case in which there are no records 130 present on spindle 5 and in which repeat switch 13 is not pushed, size reset lever 18 is mechanically locked by cam 40 so that tone arm 6 is not led in. In particular start/stop switch 10 is pushed to rotate drive gear 65 so that tone arm 6 is held in its arm rest position after it has been returned.

In record player thus far described, if the start/stop switch 10 is pushed during the record playing operation, this operation is also ended. More specifically, if start/stop switch 10 is pushed during the record playing operation, switch 10 generates a stop signal, which is dominant over all other signals to effect the stop condition. This operation is similar to the case in which tone arm 6 is not at its rest position during the aforementioned starting operation. Accordingly, plunger 82 is energized, when start/stop switch 10 is turned ON, to thereby effect one rotation of drive gear 65. At this time, however, since the record is being played, arm switch 22 is turned ON so that electric power is not fed to three-position plunger 44. As a result, nothing but the automatic return operation is performed so that tone arm 6 is swung to its rest position. Tone arm 6 is held in its rest position, as shown in FIG. 14, by the actions of size cam 40 and size reset lever 18 after it has been returned. In other words, in this case, the rear half rotation of drive gear 65 is idle so that the record player is brought into its stop condition. It should, be noted that switch 10 therefore selectively acts as a start switch and as a stop switch.

Moreover, even if a record 130 is left on center spindle 5 during the stopping operation, the record never drops onto turntable 3. In other words, since three-position plunger 44 is deenergized, size cam 40 is held in the position shown in FIG. 14. This position of size cam 40 is fed back through rod 50 to feedback lever 52 so that the leading end portion 138 of lever 52 takes a position facing projection 139 of actuating lever 58. As a result, neither actuating lever 58 nor detecting lever 60 can swing any more in the clockwise direction, as viewed in FIG. 14, about the pin 61, so that record 130 is not dropped on turntable 3. The prevention of that dropping operation is always performed during operations in which size cam 40 takes the position shown in FIG. 14 to thereby block tone arm 6 from being led in. As a result, no record 130 drops unless the record playing operation is performed.

In record player thus far described, moreover, the tone arm 6 can be manually operated to play the records without the need of a change-over switch between the automatic and manual operations. More specifically, when the tone arm 6 is led in by a manual operation, lead-in lever 17 is swung to turn on switch 22 shown in FIG. 4 so that motor 88 is driven through the transistor 103. As a result, the record playing operation is started. Moreover, since the positions of switch 22 and cam switch 86 at that time are the same as that during the automatic operation and since the operating mechanisms are similar to those used during the automatic operation, the automatic operation is thereafter continued to effect the automatic changing operation or the automatic repeat operation.

If tone arm 6 is returned to its arm rest position by a manual operation during the automatic playing operation, the stop condition is automatically performed. More specifically, if tone arm 6 is manually returned, lead-in lever 17 also returned so that its projection 20 pushes arm switch 22. Switch 22 is then turned OFF so that transistor 103 is also rendered inoperative. As a result, motor 88 is stopped so that turntable 3 is accordingly stopped.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A record playing apparatus of the type including a center spindle on which records are adapted to be held and then dropped onto a turntable to be played, said record playing apparatus comprising:
    arm means for reproducing signals recorded on a record situated on said turntable;
    detecting means for detecting the position of said arm means;
    common operating means for commonly controlling lead-in of said arm means from an inoperative position to an operative position and return of said arm means from an operative position to said inoperative position such that said lead-in of said arm means from said inoperative position to an operative position occurs only when said detecting means detects that said arm means is in said inoperative position; and
    stopping means for controlling said common operating means to return said arm means from an operative position to said inoperative position when said detecting means detects that said arm means is in an operative position, said stopping means including three position plunger means which occupies a neutral position during return of said arm means from an operative position to said inoperative position, and record size selecting means associated with said three position plunger means for maintaining said arm means in said inoperative position after the latter is controlled by said stopping means to return thereto from an operative position so as to bring said record playing apparatus to a stop condition.

2. A record playing apparatus according to claim 1, wherein said detecting means includes arm switch means for detecting whether said arm means is in one of an operative position and an inoperative position.

3. A record playing apparatus of the type including a center spindle on which records are adapted to be held and then dropped onto a turntable to be played, said record playing apparatus comprising:
    arm means for reproducing signals recorded on a record situated on said turntable;
    detecting means for detecting the position of said arm means;
    common operating means for commonly controlling lead-in of said arm means from an inoperative position to an operative position and return of said arm means from an operative position to said inoperative position such that said lead-in of said arm means from said inoperative position to an operative position occurs only when said detecting means detects that said arm means is in said inoperative position, said common operating means including drive means for controlling said arm means to rotate about a pivot thereof, forward and a backward rotation of said arm means being accomplished by the completion of one cycle of said drive means, and means for changing over said record playing apparatus to an automatic operating condition when said arm means is manually led in from said inoperative position to an operative position so as to reproduce signals recorded on a record situated on said turntable; and
    stopping means for controlling said common operating means to return said arm means from an operative position to said inoperative position when said detecting means detects that said arm means is in an operative position.

4. A record playing apparatus according to claim 3, wherein said means for changing over includes said detecting means for detecting the position of said arm means, and second detecting means for detecting the angular position of said drive means.

5. A record playing apparatus according to claim 4, wherein said first-mentioned detecting means includes arm switch means for detecting whether said arm means is in one of an operative position and an inoperative position.

6. A record playing apparatus of the type including a center spindle on which records are adapted to be held and then dropped onto a turntable to be played, said record playing apparatus comprising:

arm means for reproducing signals recorded on a record situated on said turntable;

detecting means for detecting the position of said arm means;

common operating means for commonly controlling lead-in of said arm means from an inoperative position to an operative position and return of said arm means from an operative position to said inoperative position such that said lead-in of said arm means from said inoperative position to an operative position occurs only when said detecting means detects that said arm means is in said inoperative position;

stopping means for controlling said common operating means to return said arm means from an operative position to said inoperative position when said detecting means detects that said arm means is in an operative position; and means for dropping a record held on said center spindle onto said turntable, said means for dropping a record being connected with said stopping means so that the dropping operation of a record by said means for dropping a record is prevented when said stopping means controls said common operating means to return said arm means from an operative position to said inoperative position.

7. A record playing apparatus of the type including a center spindle on which records are adapted to be held and then dropped onto a turntable to be played, said record playing apparatus comprising:

arm means for reproducing signals recorded on a record situated on said turntable;

detecting means for detecting the position of said arm means;

common operating means for commonly controlling lead-in of said arm means from an inoperative position to an operative position and return of said arm means from an operative position to said inoperative position such that said lead-in of said arm means from said inoperative position to an operative position occurs only when said detecting means detects that said arm means is in said inoperative position;

stopping means for controlling said common operating means to return said arm means from an operative position to said inoperative position when said detecting means detects that said arm means is in an operative position, said stopping means including three position plunger means which occupies a neutral position during return of said arm means from an operative position to said inoperative position, record size selecting means associated with said three position plunger means for maintaining said arm means in said inoperative position after the latter is controlled to return thereto from an operative position by said stopping means so as to bring said record playing apparatus to a stop condition, and inhibiting means connected with said record size selecting means for preventing the dropping of a record from said center spindle when said three position plunger means occupies said neutral position; and means for dropping a record held on said center spindle onto said turntable, said means for dropping a record being connected with said stopping means so that the dropping operation of a record by said means for dropping a record is prevented when said stopping means controls said common operating means to return said arm means from an operative position to said inoperative position.

* * * * *